(12) United States Patent
Hausmann et al.

(10) Patent No.: US 8,586,663 B2
(45) Date of Patent: Nov. 19, 2013

(54) POLYMER COMPOSITION COMPRISING POLYAMIDE AND IONOMER

(75) Inventors: Karlheinz Hausmann, Auvernier (CH); Richard T. Chou, Hockessin, DE (US); Herbert Vernon Bendler, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 99 days.

(21) Appl. No.: 13/367,423

(22) Filed: Feb. 7, 2012

(65) Prior Publication Data

US 2012/0202940 A1 Aug. 9, 2012

Related U.S. Application Data

(60) Provisional application No. 61/440,559, filed on Feb. 8, 2011.

(51) Int. Cl.
*C08L 77/02* (2006.01)
*B82Y 30/00* (2011.01)

(52) U.S. Cl.
USPC ............ 524/514; 525/183; 977/773; 977/902

(58) Field of Classification Search
USPC .................... 524/514; 525/183; 977/773, 902
See application file for complete search history.

(56) References Cited

U.S. PATENT DOCUMENTS

| | | |
|---|---|---|
| 3,264,269 A | 8/1966 | Rees |
| 3,317,631 A | 5/1967 | Rees |
| 4,174,358 A | 11/1979 | Epstein |
| 4,248,990 A | 2/1981 | Pieski |
| 5,674,579 A | 10/1997 | Ladouce et al. |
| 5,700,890 A | 12/1997 | Chou |
| 5,859,137 A | 1/1999 | Chou |
| 5,866,658 A | 2/1999 | Talkowski |
| 5,886,103 A | 3/1999 | Bellinger |
| 5,902,869 A | 5/1999 | Chou |
| 6,756,443 B2 * | 6/2004 | Feinberg ......................... 525/66 |
| 6,800,690 B2 | 10/2004 | Rajagopalan |
| 2002/0004555 A1 | 1/2002 | DiBenedetto |
| 2005/0020762 A1 | 1/2005 | Chou |
| 2011/0020573 A1 | 1/2011 | Chou |

FOREIGN PATENT DOCUMENTS

| | | |
|---|---|---|
| DE | 19502371 A1 | 8/1996 |
| EP | 0382539 A1 | 8/1990 |
| EP | 0 342 244 | 12/1994 |
| JP | 7316368 A | 12/1995 |
| JP | 9 111118 | 4/1997 |
| JP | 2006083375 A | 3/2006 |
| WO | 95/11333 | 4/1995 |
| WO | 98/08901 A1 | 3/1998 |
| WO | 01/53415 A1 | 7/2001 |
| WO | 2006/053297 A1 | 5/2006 |
| WO | 2011/011577 A1 | 1/2011 |

* cited by examiner

*Primary Examiner* — Robert D. Harlan

(57) ABSTRACT

Disclosed in a composition comprising at least one ionomer (A) and at least one blend comprising at least one polyamide and at least one ionomer (B) wherein the polyamide is an aliphatic polyamide and the ionomer (B) is a copolymer of ethylene, an α, β-unsaturated $C_3$-$C_8$ carboxylic acid, at least one ethylenically unsaturated dicarboxylic acid or derivative thereof, and optionally an alkyl (meth)acrylate.

20 Claims, 2 Drawing Sheets

POLYMER COMPOSITION COMPRISING POLYAMIDE AND IONOMER

This application claims priority to U.S. provisional application No. 61/440,559, filed Feb. 8, 2011; the entire disclosure of which is incorporated herein by reference.

The present invention relates to polymeric compositions comprising at least one polyamide and at one least blend of polyamide and polyolefin.

BACKGROUND OF THE INVENTION

In the field of sporting goods, especially in the field of winter sporting goods, there is a continued desire to improve the mechanical properties of the sporting gear in order to allow for a safer, more customized and faster sporting experience.

In particular, when manufacturing winter sport footwear, such as for example skiing boots or skating boots, a key property is the flex modulus of the material employed in the outer shell of the boot. Boots that are too stiff or rigid are not well received among athletes, because they are uncomfortable and unresponsive. Expressed alternatively, the flex modulus of the boot material needs to be reasonably low over a wide range of temperatures of from −20° C. to 20° C.

For this reason, the currently used materials in boots are "softer" polymers such as for example ionomers or thermoplastic polyurethanes (TPUs), which have a comparatively low flex modulus and yield flexible and responsive skiing boots.

However, while boots made of ionomer have excellent flex properties at temperatures of form about −20° C. to about 20° C., they have a propensity to deform under creep stress. For example, in a car stationed in the sunlight, temperature can easily climb to 50 or 70° C., a temperature at which the currently used ionomers starts deforming or warping. This is of course undesirable, because after cooling down, the boot will not fit in the intended way onto the foot of the wearer. Repeated heating and cooling further exacerbate this problem.

While not suffering from deformation under creep stress, boots made from thermoplastic polyurethanes have other drawbacks. For instance, the flex properties of TPUs can change dramatically over the ranges encountered in winter that is of from about −20° C. to about 20° C. While the flex properties of TPUs are satisfactory in the upper parts of the range, TPUs rigidify significantly (by up to 400%) in the lower parts of the range, i.e., the colder it becomes, the less flexible and comfortable boots made of TPU become.

In recent years, there have been efforts to customize skiing boots by adapting the foam liners of the boot to the feet of the wearer upon purchase by using heat curable foams. This method however, was limited in that the polymeric outer shell of the boot was not adapted to the anatomy of the wearer, because of the temperatures necessary to soften the polymeric shell.

Polymers such as TPUs or polyamides require very high temperatures of up to 200° C. to reach a point where they are soft enough, which makes it impossible to adjust the boot, because the user is required to shoe the boot during the adjustment process.

On the other hand, ionomers may be suitable for boot shells that can be adjusted at temperatures around 50° C., but they suffer from the above-mentioned deformation problems of creep deformation.

There is therefore a strongly felt need for a polymeric composition exhibiting suitable flex properties, even across a broad temperature range, that can be used for sporting footwear, which does not suffer from the above-mentioned deformation problems under heat stress and that can be adjusted to the anatomy of the wearer without exposing him to a burning risk.

SUMMARY OF THE INVENTION

The above problems can be solved by providing a composition comprising at least one ionomer (A) and at least one blend comprising at least one polyamide and at least one ionomer (B), wherein the polyamide is an aliphatic polyamide and the ionomer (B) of the blend is a copolymer of (a) ethylene, (b) from 5 weight percent to 15 weight percent of an α, β-unsaturated $C_3$-$C_8$ carboxylic acid based on the weight of the ionomer (B) of the blend, (c) from 0.5 weight percent to 12 weight percent of at least one comonomer that is an ethylenically unsaturated dicarboxylic acid or derivative thereof selected from the group consisting of maleic acid, fumaric acid, itaconic acid, maleic anhydride, and a $C_1$-$C_4$ alkyl half ester of maleic acid, based on the weight of the ionomer of the blend, and (d) from 0 weight percent to 30 weight percent of monomers selected from alkyl acrylate and alkyl methacrylate, based on the weight of the ionomer of the blend, wherein the alkyl groups have from one to twelve carbon atoms; and wherein the carboxylic acid functionalities present in the at least one ionomer (B) are at least partially neutralized by one or more alkali metal, transition metal, or alkaline earth metal cations.

Furthermore, the invention provides a composition as described above, obtainable by first mixing the at least one aliphatic polyamide and the at least ionomer (B) into a blend, and subsequently mixing said blend into the at least ionomer (A).

The invention also provides an article comprising a composition as described above.

DETAILED DESCRIPTION OF THE INVENTION

Figure 1:
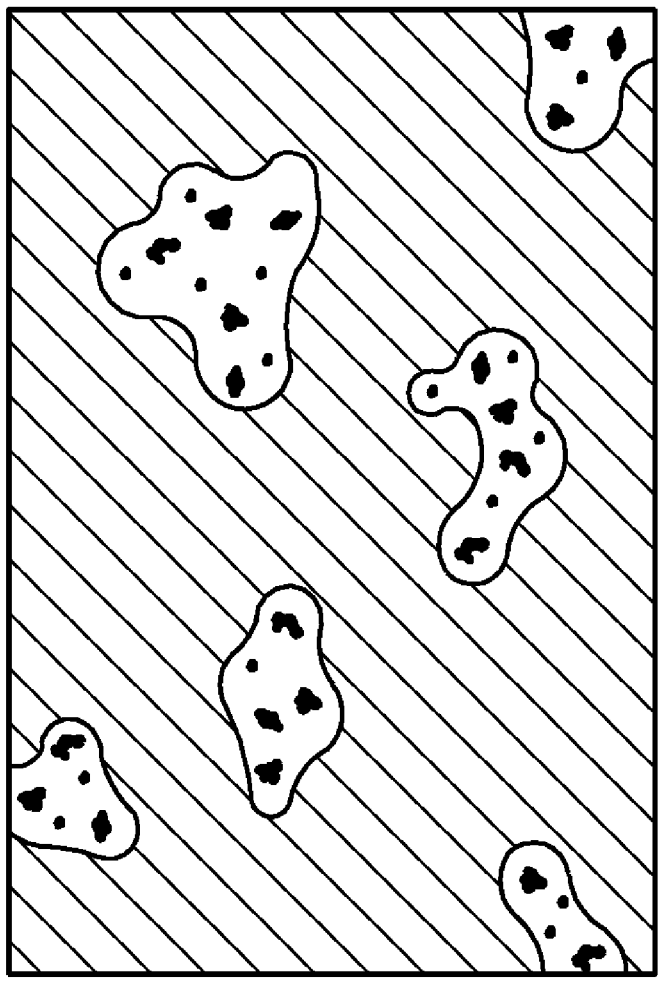
FIG. 1 depicts the morphology of a composition disclosed herein.

All trademarks or tradenames are in upper case.

The polymeric composition can be an intimate mixture of at least one ionomer (A) and a blend comprising at least one aliphatic polyamide and at least one ionomer (B) selected from a special family of ionomers and can provide new materials that are highly suitable for applications where high mechanical rigidity is needed at relatively low temperatures, in conjunction with good formability at temperatures below 100° C. The new materials can overcome some of the major deficiencies of both polyamides and ionomers, while continuing to retain most of the desirable attributes.

The composition can comprise at least one ionomer (A) in amounts of from 10 weight % to 60 weight %, preferably of from 20 weight % to 40 weight % or from 20 weight percent to 30 weight percent, based on the total weight of the composition.

The ionomer (A) may be chosen among E/X/Y copolymers where E is ethylene, X is a $C_3$ to $C_8$ α,β ethylenically unsaturated carboxylic acid, and Y is a comonomer selected from alkyl acrylate, alkyl methacrylate, or both.

The $C_3$ to $C_8$ α,β ethylenically unsaturated carboxylic acid X can be present of from 2 weight percent to 30 weight percent, preferably 5 weight percent to 15 weight percent, based on the weight of the ionomer (A).

Suitable $C_3$ to $C_8$ α,β ethylenically unsaturated carboxylic acids X can be chosen among methacrylic acid, acrylic acid, or both and methacrylic acid being preferred.

The comonomer Y can be present of from 0.1 weight percent to 40 weight percent, preferably 10 weight percent to 30 weight percent, based on the weight of the ionomer (A) and the alkyl groups may have of from 1 to 8 carbon atoms. Suitable alkyl groups can be chosen for example among methyl, ethyl, propyl, butyl such as n-butyl, sec-butyl, isobutyl and tert-butyl, with butyl being preferred.

The carboxylic acid functionalities present in the ionomer (A) are at least partially neutralized by one or more alkali metal, transition metal, or alkaline earth metal cations such as for example from sodium, zinc, lithium, magnesium, and calcium; and more preferably zinc or magnesium, with zinc being the most preferred.

The blend can comprise at least one aliphatic polyamide and at least one ionomer (B).

The blend can be present in the composition of from 40 weight percent to 90 weight percent, preferably of from 60 weight percent to 80 weight percent, more preferably of from 70 weight percent to 80 weight percent, based on the total weight of the composition.

The aliphatic polyamide of the blend may be present of from 20 weight percent to 65 weight percent, preferably of 30 weight percent from to 65 weight percent, more preferably of 55 weight percent from to 65 weight percent, based on the total weight of the blend.

The aliphatic polyamide of the blend may be chosen, for example, among the group of polyamides obtainable from lactams or amino acids (e.g. polyepsiloncaprolactam (PA6) or PA11), or from condensation of diamines such as hexamethylene diamine with dibasic acids such as succinic, adipic, or sebacic acid. Copolymers and terpolymers of these polyamides are also included. Preferably, the aliphatic polyamide may be chosen among polyepsiloncaprolactam (PA6); polyhexamethylene adipamide (PA6, 6); PA11; PA12; PA12,12 and copolymers and terpolymers such as PA6/6,6; PA 6,10; PA6,12; PA6,6/12; PA6/6,6/6,10 and PA6/6T. More preferably, the polyamide is polyepsiloncaprolactam (PA6), PA6, 10 or polyhexamethylene adipamide (PA6,6); polyepsiloncaprolactam (PA6) being the most preferred.

The ionomer (B) of the blend may be present in the blend from 35 to 80 weight %, preferably of 35 from to 70%, more preferably of 35 from to 45%, based on the total weight of the blend.

The ionomer (B) may be chosen, for example, among ionomers containing higher amounts of dicarboxylic acid moieties that are derived from ethylenically unsaturated dicarboxylic acid comonomers, such as for example maleic anhydride and ethyl hydrogen maleate, which moieties are at least partially neutralized by one or more alkali metal, transition metal, or alkaline earth metal cations.

The ionomer (B) can be a copolymer (or ter-polymer) of ethylene, $C_3$ to $C_8$ α,β-ethylenically unsaturated carboxylic acid, and at least one comonomer that is an ethylenically unsaturated dicarboxylic acid.

The ethylenically unsaturated dicarboxylic acid may be present in an amount of from 3 weight percent to 25 weight percent, preferably of from 4 weight percent to 10 weight percent, based on the total weight of the ionomer (B).

Suitable ethylenically unsaturated dicarboxylic acid comonomers may be, for example, maleic anhydride (MAH), $C_1$ to $C_4$ alkyl half ester of maleic acid such as ethyl hydrogen maleate (also known as maleic acid monoethylester—MAME), itaconic acid (ITA) and fumaric acid.

The at least one ionomer (B) can contain additional comonomers, such as for example alkyl (meth)acrylate, wherein the alkyl groups have from 1 to 8 carbon atoms. Alkyl (meth)acrylate can include alkyl acrylate, alkyl methacrylate, or both.

The alkyl (meth)acrylate comonomer may be present in an amount of from 0 to 30 weight percent, preferably of from 0 to about 15 weight percent, based on the weight of the ionomer (B). Suitable alkyl (meth)acrylates may be chosen among alkyl (meth)acrylates having alkyl groups that have from 1 to 8 carbon atoms, such as methyl acrylate, ethyl acrylate and n-butyl acrylate (nBA), with n-butyl acrylate (nBA) being preferred.

Examples of ionomers (B) include copolymers of ethylene, methacrylic acid and ethyl hydrogen maleate (E/MAA/MAME) and copolymers of ethylene, acrylic acid and maleic anhydride (E/AA/MAH).

The carboxylic acid functionalities present in ionomer (B) can be neutralized at least partially, or from 10 to 99.5 percent, typically 10 to 70 percent, by one or more alkali metal, transition metal, or alkaline earth metal cations such as from example lithium, sodium, potassium, magnesium, calcium, barium, lead, tin, zinc, aluminum; or combinations of such cations. Preferably, the carboxylic acid functionalities present in the at least one ionomer (B) can be neutralized of from 35 to about 70 percent by at least one metal cation selected from sodium, zinc, lithium, magnesium, and calcium; and more preferably zinc or magnesium, with zinc being the most preferred.

The neutralization may be effected by first making the ionomer and treating it with inorganic base(s), with alkali metal, alkaline earth metal or transition metal cation(s), as known in the art.

The polymeric compositions of the invention can additionally comprise about 0.0001 to about 50% (based on the total weight of the composition) optional materials, such as conventional additives used in polymeric materials including: plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, nucleating agents and/or mixtures thereof.

If the composition comprises a nucleating agent, the nucleating agent can be present from 0.1 to 1 weight percent, based on the total weight of the composition.

The composition comprising of at least one ionomer (A) and at least one blend comprising at least one polyamide and at least one ionomer (B) can be obtained by the a one-step or a two-step mixing process, with the two-step mixing process being preferred:

In a first step, at least one polyamide and at least one ionomer (B) can be fed into a suitable mixing device in solid form, such as for example in pellets form, to be blended Suitable mixing devices can be chosen among twin screw extruders with a mixing screw, Brabender-type mixers, internal mixers, Farrell continuous mixers or Buss Ko kneaders. Preferably, the mixing device is a twin screw extruder with a mixing screw operating at a temperature of from 260° C. to 300° C.

During the mixing step, the ionomer (B) can be dispersed in the polyamide (which forms the continuous phase) as extremely fine particles which have a very narrow particle size distribution. After melt mixing, the blend is passed through the die of the extruder and then cut to yield solid particles of polyamide/ionomer blend such as for example pellets.

In a second step, the blend of ionomer (B) and polyamide prepared in the first step is subsequently combined with the at least one ionomer (A) in a suitable mixing device. When using solid pellets, the mixing device can be the same as disclosed above such as a twin-screw extruder operating at a temperature of from 260° C. to 300° C. Alternatively, the molten blend of ionomer (B) and polyamide, and the molten ionomer (A), can be injected simultaneously into a mold in their molten form to achieve a mixing of the two components. Preferably, the mixing device is a twin-screw extruder.

Following the two-step mixing process, the compound according to the present invention may be processed into various forms for storage such as for example pellets.

The first step of the two-step mixing process has the effect of producing a dispersion of ionomer (B) in a continuous phase of polyamide (the blend). The second step, in which the blend is combined with the ionomer (A) has the effect of producing a composition where the blend itself is dispersed in a continuous phase of the ionomer (A), yielding a "dispersion-in-dispersion"/{[dispersion of polyamide in ionomer (B)] dispersed in ionomer (A)}.

FIG. 1 shows a non-limiting, exemplary drawing depicting the morphology of the composition according to the invention.

The size of the blend particles can be characterized by defining the longest diameter of a blend particle dispersed in the at least one ionomer (A) and an orthogonal second longest diameter of a blend particle. The ratio between the longest diameter and the second longest diameter can be of from about 1 (a spherical shaped particle) to about 10, more preferably of from 1 to about 6 (an ellipsoid, "zeppelin" or "cigar" shaped particle).

Figure 2:
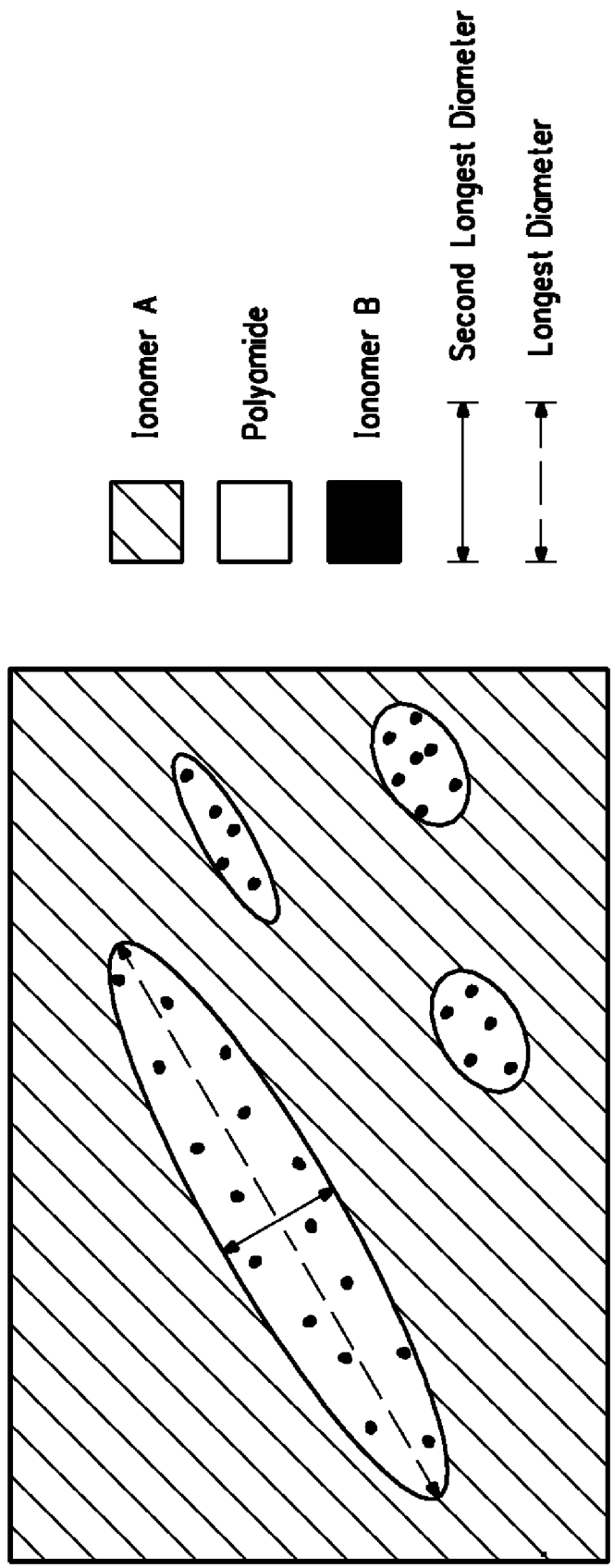
FIG. 2 is depicting the longest and second longest diameter of a particle.

FIG. 2 shows a non-limiting, exemplary drawing depicting the longest and second longest diameter of a particle.

The longest diameter of the blend particles can be of from 200 nm to about 600 nm, and the second longest diameter of the blend can be of from 40 nm to 120 nm.

The compound according to the invention can be used to manufacture various articles such as for example automotive parts or sport articles such as for example the outer shell of skiing boots, snowboard boots, skating boots, ice skating boots, in-line skate boots, or mountaineering boots. In particular, the sport articles can be articles that can be fitted to the anatomy of the user by thermoforming. In the case of skiing boots, for example, this means that the rigid outer shell, when manufactured in the composition of the present invention, can be heated to the Vicat softening point of the ionomer (A), as defined in ASTM D1525-09 and then adjusted to the foot anatomy of the user.

The adjustment of the heated outer shell may be obtained by for example by a) placing the outer shell in an oven, b) heating the outer shell to the softening point, c) removing the outer shell from the oven, d) reinserting the liner of the boot back into the outer shell, e) shoeing the boot, f) wrapping the still soft boot in a hollow bag that fits the outline of the boot connected to a pump g) applying vacuum or overpressure to press the bag against the boot and at the same time press the softened shell of the boot against the foot of the user and h) maintaining the vacuum or overpressure until the softened shell has cooled and solidified.

The user can leave the boot on during the adjustment process, whereas in the past, a heat-insensitive replica of the user foot had to be made at great economic burden for the higher temperature adjustment procedures.

The sport articles and/or the outer shells as described above may be manufactured by injection molding the composition of the present invention into a mold or by simultaneously injecting the ionomer (A) and blend into a mold. Alternatively, the composition of the present invention may be molded into sport articles by rotomolding or injection blow molding the pre-blended composition.

EXAMPLES

Comparative Example

A composition was prepared by mixing simultaneously the 4.4 kg of nylon 6, obtainable from BASF under the trademark ULTRAMID B3, 2.5 kg of ionomer (B) comprising ethylene, 11 weight percent of methacrylic acid and 6 weight percent maleic anhydride monoethylester having 40% of the available acid moieties neutralized with zinc cations, 3 kg of a zinc ionomer based on ethylene, methacrylic acid and n-butylacrylate, obtainable from E.I. Du Pont de Nemours & Co (Delaware, US; DuPont) under the trademark SURLYN 9320 and 0.1 kg of a nucleating agent obtainable from Brueggemann Chemical under the trademark BRUGGOLEN P22 in a Werner Pfleiderer 30 mm twin screw extruder operating at a temperature of 285° C. and having a L/D ratio of 29.

Inventive Example 1

A first blend was prepared by mixing 5.9 kg of nylon 6, obtainable from BASF under the trademark ULTRAMID B3, 4 kg of ionomer (B) comprising ethylene, 11 weight percent of methacrylic acid and 6 weight percent maleic anhydride monoethylester having 40% of the available acid moieties neutralized with zinc cations, 0.1 kg of a nucleating agent obtainable from Brueggemann Chemical under the trademark BRUGGOLEN P22 in a Werner Pfleiderer 30 mm twin screw extruder operating at a temperature of 285° C. and having a L/D ratio of 29. 7 kg of the thus obtained blend were then mixed with 3 kg of a zinc ionomer based on ethylene, methacrylic acid and n-butylacrylate, obtainable from DuPont under the trademark SURLYN 9320 in a Werner Pfleiderer 30 mm twin screw extruder operating at a temperature of 285° C. and having an L/D ratio of 29.

Inventive Example 2

A first blend was prepared by mixing 4.95 kg of nylon 6, obtainable from BASF under the trademark ULTRAMID B3, 4.95 kg of ionomer (B) comprising ethylene, 11 weight percent of methacrylic acid and 6 weight percent maleic anhydride monoethylester having 40% of the available acid moieties neutralized with zinc cations, 0.1 kg of a nucleating agent obtainable from Brueggemann Chemical under the trademark BRUGGOLEN P22 in a Werner Pfleiderer 30 mm twin screw extruder operating at a temperature of 285° C. and having a L/D ratio of 29.

7 kg of the thus obtained blend were then mixed with 3 kg of a zinc ionomer based on ethylene, methacrylic acid and n-butylacrylate, obtainable from DuPont under the trademark SURLYN 9320 in a Werner Pfleiderer 30 mm twin screw extruder operating at a temperature of 285° C. and having an L/D ratio of 29.

The thus obtained compositions were then molded into flex bars and conditioned for 24 hours at 50% relative humidity and 25° C. and tested for flex modulus according to ASTM D790 at 25° C. Results are shown in Table 1 (the % was based on weight), which shows the flex modulus in kilopound per square inch (Ksi) as measured according to ASTM D790.

As can be seen in the Table 1, the simultaneous mixing of the three components (Nylon 6, Ionomer (B) and SURLYN 9320) yielded compositions that displayed a higher flex modulus (or stiffness) when compared to compositions that are obtained according to the invention. The lower the flex modulus of a composition is, the less rigid it is.

TABLE 1

|  | Nylon 6 (%) | Ionomer (B) (%) | SURLYN 9320 (%) | Flex modulus (Ksi) | Procedure |
|---|---|---|---|---|---|
| Comparative Example | 44 | 26 | 30 | 82.1 | 1-step |
| Invention Example 1 | 42 | 28 | 30 | 61 | 2-step |
| Invention Example 2 | 35 | 35 | 30 | 41 | 2-step |

The invention claimed is:

1. A composition comprising a blend dispersed in a continuous phase of an ionomer (A) wherein
   the blend comprises a continuous phase of a polyamide having dispersed therein an ionomer (B);
   the blend has a particle size ratio of about 1 to 10 and the ratio is defined by the longest diameter of a blend particle dispersed in the ionomer (A) to an orthogonal second longest diameter of a blend particle;
   the ionomer (A) is present in the composition, based on the total weight of the composition, from 10 to 60%;
   the polyamide is an aliphatic polyamide;
   the ionomer (B) is a copolymer of ethylene, 5 to 15 weight % of an $C_3$ to $C_8$ α,β ethylenically unsaturated carboxylic acid, 3 to 25 weight % of at least one comonomer, and 0 to 30 weight % of alkyl (meth)acrylate; all weight % is based on the weight of ionomer (B);
   the comonomer is an ethylenically unsaturated dicarboxylic acid or derivative thereof;
   the alkyl (meth)acrylate is alkyl acrylate, alkyl methacrylate, or combinations thereof; the alkyl group has 1 to 8 carbon atoms; and
   the carboxylic acid functionalities present in the ionomer (B) are at least partially neutralized by one or more alkali metal cations, transition metal cations, alkaline earth metal cations, or combinations of two or more thereof.

2. The composition of claim 1 wherein the comonomer is selected from the group consisting of maleic acid, fumaric acid, itaconic acid, maleic anhydride, a $C_1$ to $C_4$ alkyl half ester of maleic acid, and combinations of two or more thereof.

3. The composition of claim 2 wherein the composition comprises 0.1 to 1 weight percent, based on the total weight of the composition, of a nucleating agent.

4. The composition of claim 2 wherein the ratio is about 1 to about 6 and the comonomer is selected from the group consisting of maleic acid, maleic anhydride, a $C_1$ to $C_4$ alkyl half ester of maleic acid, and combinations of two or more thereof.

5. The composition of claim 2 wherein the longest diameter of the blend particles is from 200 nm to about 600 nm.

6. The composition of claim 5 wherein the longest diameter of the blend particles is from 20 nm to about 120 nm.

7. The composition of claim 6 wherein, based on based on the total weight of the blend, the polyamide is present in the blend from 30 to 65% and the ionomer (B) is present in the blend from 70 to 35%.

8. The composition of claim 7 wherein the polyamide is selected from the group consisting of nylon 6, nylon 11, nylon 66, and combinations of two or more thereof.

9. The composition of claim 8 wherein the carboxylic acid in the ionomer (B) is at least partially neutralized by a metal cation selected from sodium, zinc, lithium, magnesium, calcium, or combinations of two or more thereof.

10. An article comprising a composition as recited in claim 1 and the article is a skiing boot, snowboard boot, skating boot, ice skating boot, in-line skate boot, or mountaineering boot.

11. The article of claim 10 wherein the composition %, based on the total weight of the composition, comprises 10% to 60 of the ionomer (A), 0.1 to 1% of a nucleating agent.

12. The article of claim 10 wherein, based on based on the total weight of the blend, the polyamide is present in the blend from 30 to 65% and the ionomer (B) is present in the blend from 70 to 35%; and the polyamide is selected from the group consisting of nylon 6, nylon 11, nylon 66, and combinations of two or more thereof.

13. The A process comprising dispersing an ionomer (B) in a continuous phase combining polyamide to produce a blend; and combining the blend with at least ionomer (A) under a condition effective to produce a composition having the blend dispersed in a continuous phase of the ionomer (A).

14. The article of claim 10 wherein the comonomer is selected from the group consisting of maleic acid, maleic anhydride, a $C_1$ to $C_4$ alkyl half ester of maleic acid, and combinations of two or more thereof.

15. The article of claim 14 wherein the composition comprises 0.1 to 1 weight percent, based on the total weight of the composition, of a nucleating agent.

16. The article of claim 15 wherein the ratio is about 1 to about 6.

17. The article of claim 16 wherein the longest diameter of the blend particles is from 200 nm to about 600 nm.

18. The article of claim 17 wherein the longest diameter of the blend particles is from 20 nm to about 120 nm.

19. The article of claim 18 wherein, based on based on the total weight of the blend, the polyamide is present in the blend from 30 to 65% and the ionomer (B) is present in the blend from 70 to 35% and the polyamide is selected from the group consisting of nylon 6, nylon 11, nylon 66, and combinations of two or more thereof.

20. The composition of claim 19 wherein the carboxylic acid in the ionomer (B) is at least partially neutralized by a metal cation selected form sodium, zinc, lithium, magnesium, calcium, or combinations of two or more thereof.

* * * * *